Sept. 19, 1950  R. L. BROWN  2,522,601
GENERATOR PROTECTIVE SYSTEM
Filed Oct. 4, 1946
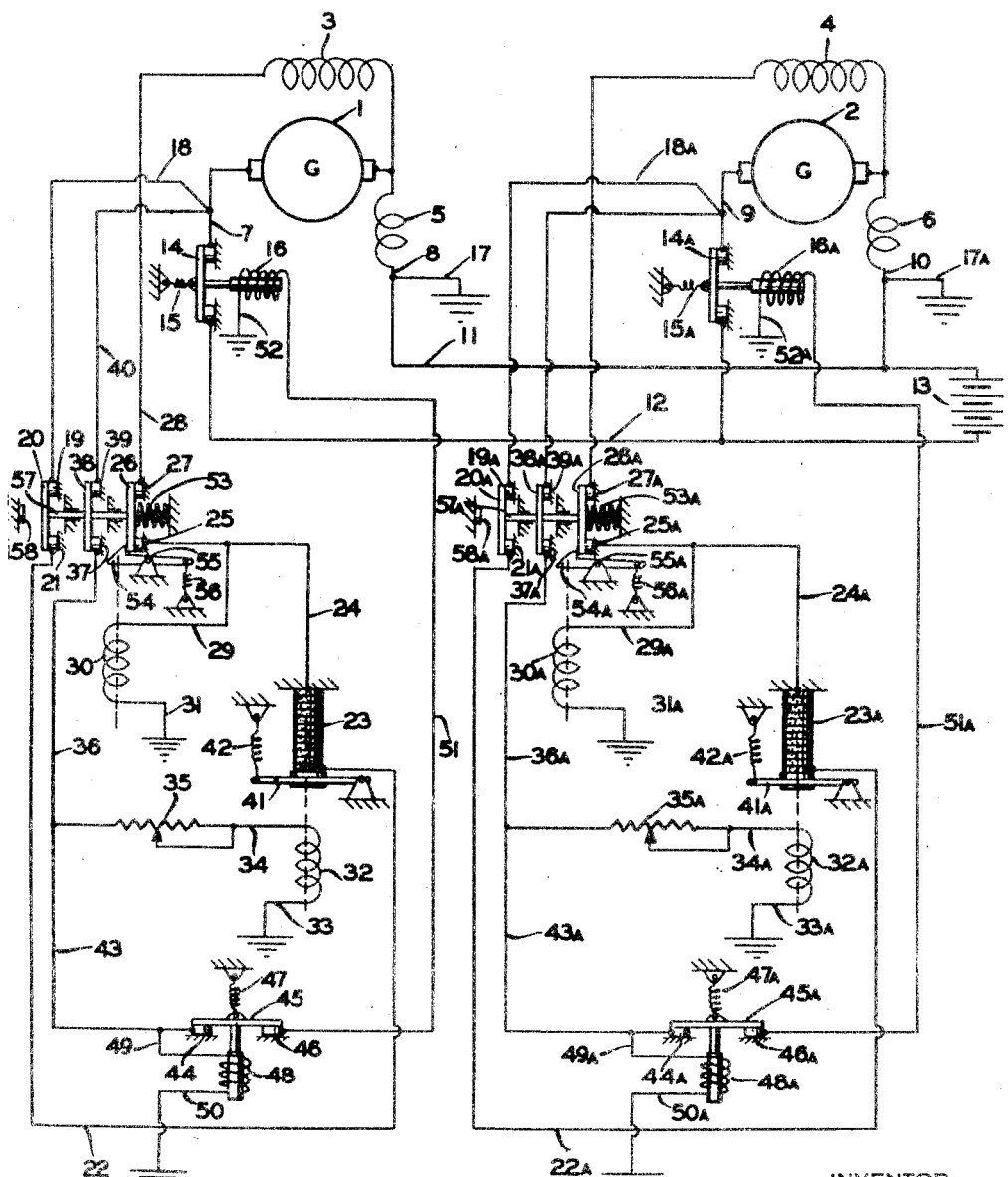
INVENTOR
ROBERT L. BROWN
BY
ATTORNEY Patented Sept. 19, 1950

2,522,601

UNITED STATES PATENT OFFICE 2,522,601

GENERATOR PROTECTIVE SYSTEM

Robert Lowell Brown, Teaneck, N. J., assignor to Bendix Aviation Corporation, Teterboro, N. J., a corporation of Delaware Application October 4, 1946, Serial No. 701,322

5 Claims. (Cl. 171—119)

1

The present invention relates to electrical generator systems and more particularly to improvements in the system of the type shown in the application for U. S. patent Serial No. 701,266, filed October 4, 1946, now Patent 2,508,665, by William F. Fell.

An object of the present invention is to provide novel means effective for opening the output connections and the generator field circuit in the event of an internal or an external short or fault between the field winding or field lead and the corresponding armature connection of the generator and which means is further effective for opening connections to the operating coils of a regulator and a line relay so as to prevent damage by the resulting overvoltage.

Another object of the invention is to provide a novel system in which a circuit breaker opens the field circuit of a generator in response to an increase in the generator field current above a predetermined safe value and also opens certain circuits to the operative equipment for protecting the same from the effects of the overvoltage.

Another object of the invention is to provide a novel system in which an overvoltage coil is connected across the field of the generator for operating a gang relay so as to affect the opening of the field circuit and certain circuits for the regulating equipment, control relays and output line of the generator so that the regulating equipment may not be damaged and the faulted generator may not be left on the line as a short.

Another object of the invention is to provide a novel relay system for taking the voltage off potential coils of a generator control relay and regulator so as to prevent the same from burning out in the event of a short between the field winding and corresponding armature lead of the generator.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

The drawing is a schematic view of a generator system embodying the present invention.

Referring to the drawing, we have indicated by numerals 1 and 2 a pair of generators having field windings 3 and 4, respectively, and compensating field windings 5 and 6. The generators 1 and 2 may be of a conventional type and are

2 connected through output lines 7 and 8, 9 and 10, respectively, to the main output lines 11 and 12, which may be connected for charging a battery 13.

Controlling the output line 7 of the generator 1 is a line switch 14 having a spring 15 for biasing the same to a circuit opening position and an electromagnetic winding 16 for biasing the switch 14 to a circuit closing position. The output line 8 of the generator 1 is grounded through a connection 17.

Leading from the output line 7 of the generator 1 is a line 18 which is connected to a switch contact 19 controlled by switch member 20 which cooperates with a second switch contact 21.

Leading from the switch contact 21 is a line 22 which in turn is connected to one end of a variable resistance carbon pile 23. The opposite end of the variable resistance carbon pile 23 is connected by a conductor 24 to a contact 25 of a second switch member 26, which member cooperates with a second switch contact 27. Leading from the switch contact 27 is a conductor 28 which is connected to the field winding 3 of the generator 1.

Leading from the conductor 24 is a conductor 29 connected to a potential coil 30 which is grounded at 31 and thereby connected across the field winding 3 and compensating winding 5 of the generator 1. With the circuit breaker 26 in the closed position as shown, it will be seen that the carbon pile 23 will be connected in series with the field 3 of the generator 1 so as to regulate the voltage across the lines 7 and 8.

The carbon pile 23 is controlled by a potential coil 32 grounded at 33 and connected by conductor 34 and a calibrating resistor 35 to a line 36 which is in turn connected at one end to a switch contact 37 controlled by switch member 38 which in turn cooperates with switch contact 39. A conductor 40 leads from the contact 39 to the output conductor 7 of the generator 1.

Thus the potential coil 32 will respond to the output voltage across the lines 7 and 8 of the generator 1. The potential coil 32 controls an armature 41 biased under tension of a spring 42 so as to tend to compress the carbon pile 23 and thereby regulate the resistance of the carbon pile 23 in a conventional manner and so as to regulate the output voltage of the generator 1 across the lines 7 and 8.

The carbon pile 23 is preferably of a type such as shown in the copending application Serial No. 612,691, filed August 25, 1945, by William G. Neild, now U. S. Patent No. 2,481,771.

The conductor 36 is connected by a conductor 43 to a switch contact 44 of a relay switch member 45 having a cooperating contact 46. The relay switch member 45 is biased under tension of a spring 47 in a circuit opening direction.

An electromagnetic winding 48 is connected by a conductor 49 to the line 43 and is grounded at the opposite end by a conductor 50. The switch contact 46 is connected by a conductor 51 to the electromagnetic winding 16 which controls the main line circuit breaker 14. The electromagnetic winding 16 is grounded by a conductor 52 so as to be connected across the output lines 7 and 8 of generator 1.

The control relay 48 is also connected across output lines 7 and 8 of the generator 1 and is arranged so that upon an output voltage across the lines 7 and 8 in excess of a predetermined value, the control relay 45 will be closed and thereby effect energization of the winding 16 and the closing of the main line relay 14.

The circuit breaker switch members 20, 38 and 26 are biased under tension of a spring 53 in a direction for opening the respective circuits controlled thereby, but the same is held from opening by a latch member 54 pivoted at 55 under tension of a spring 56 so as to normally lock the several switch members 20, 38 and 26 in a circuit closing position.

The several circuit breakers 20, 38 and 26 are mechanically connected by a suitable rod 57. Thus the circuit breakers 20, 38 and 26 are normally held in a circuit closing position by the latch 54. The latch 54 is controlled by the electromagnetic winding 30 which is connected as previously described across the field winding 3 of the generator 1. Thus upon the field current through the winding 3 increasing above a predetermined maximum safe value effecting a corresponding increase in voltage drop or fall of potential across the field winding 3, the electromagnet 30 will bias the latch 54 in a counterclockwise direction permitting the circuit breakers 20, 38 and 26 under tension of the spring 53 to move to a circuit opening position limited by a suitable stop 58.

Such unsafe conditions of current flow may well occur upon either a short across the carbon pile regulator 23 or upon a short of the coil 32 causing an abnormal increase in the generator field current. In either of such cases the opening of the circuit breaker 26 will cause the current flow through the field winding 3 to cease and the voltage produced by the generator 1 to drop rapidly to zero.

The aforementioned unsafe conditions may also result upon an external or internal short or connection between the output line 7 and the field line 28 in which event the opening of the circuit breaker 26 would not affect the energization of the winding 3. The opening of the circuit breaker 26, however, would also effect the opening of circuit breakers 20 and 38 which are mechanically connected thereto by the rod 57.

In the latter event, the opening of the circuit breaker 20 would cause an opening of the line 36 and deenergization of the control winding 16 so that the main output line relay 14 would be biased to an open position by the spring 15.

Also the opening of the circuit breaker 38 would also disconnect the relay control winding 32 and control winding 48 from the output line 7 of the generator 1 so as to prevent these windings from becoming damaged or burned out by excess output voltage.

Likewise the opening of the circuit breaker 20 would prevent damage to the control winding 30 in the event of a short across the pile 23 and thereby prevent voltage from the output of the generator 1 from going through the shorted pile 23 to the control winding 30 which might otherwise cause damage thereto.

Also, the opening of the main line circuit breaker 14 would remove the generator 1 from the main lines 11 and 12 and prevent damage which might otherwise occur.

It will be seen from the foregoing that there has been provided a novel means for preventing damage even though a fault occur by a short between the generator field and its corresponding armature connection. A similar safety provision is provided for the generator 2 in which like numerals having applied thereto the letter A indicate corresponding parts to those described with reference to the generator 1. While only two generators are shown, any desired number of generators may be employed in the system.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In combination, a load circuit, a plurality of generators connected in said load circuit, each of said generators having a field circuit, a regulator connected in each of said field circuits, a control winding for each of said regulators and connected across the output of its associated generator, snap-action relay means for effecting the disconnection of the load circuit, field circuit, regulator and control winding from one of said generators, said relay means including an electromagnetic control winding connected across the field winding of the one generator and effective upon a rise in the voltage drop across the field winding of its associated generator and above a predetermined safe value for effecting such disconnection, and means maintaining the snap action relay means of the other of said generators in a circuit closing position irrespective of the opening of the snap action relay means of the one generator.

2. In combination, a load circuit, a plurality of generators connected in said load circuit, each of said generators having a field circuit, a regulator connected in each of said field circuits, a control winding for each of said regulators and connected across the output of its associated generator, relay means for effecting the disconnection of the load circuit, regulator and control winding from one of said generators, said relay means including an electromagnetic control winding connected across the field winding of the one generator and effective upon a rise in the voltage drop across the field winding of its associated generator and above a predetermined safe value for effecting such disconnection, and means maintaining the relay means of the other of said generators in a circuit closing position irrespective of the opening of the relay means of said one generator.

3. In combination, a load circuit, a plurality of generators connected in said load circuit, each of said generators having a field circuit, a regulator connected in each of said field circuits, a control winding for each of said regulators and connected across the output of its associated generator, switch means connected in the field circuit, regulator circuit, and control winding circuit of each of said generators, and control means for each of said switch means including spring means for biasing the switch means in a circuit opening sense, latch means for locking the switch means in a circuit closing sense, and an electromagnetic-winding connected across the field of its associated generator and effective upon a rise in the voltage drop across the field winding of its associated generator and above a predetermined safe value for biasing said latch means so as to permit said spring means to actuate said switch means in a circuit opening sense, and the switch means of the other of said generators retained in a circuit closing position by its associated latch means irrespective of the opening of the switch means of the faulted generator.

4. In a multiple generator system, the combination comprising a plurality of generators, associated with each of said generators a field circuit, a regulator connected in said field circuit, a control winding for said regulator and connected across the output of the associated generator, a relay switch to control the connection of the associated generator to a load line, a relay coil and energizing circuit to actuate said relay switch, an overvoltage coil connected across the field of each generator, a gang relay operably associated with each overvoltage coil, said gang relay including switch members to control the field circuit, regulator circuit, control winding circuit, and circuit of the relay coil, said overvoltage coil effective upon a rise in the voltage drop across the field winding of its associated generator and above a predetermined safe value to actuate its associated switch members so as to open the circuits associated therewith to disconnect only the faulted generator, and its associated regulator, control winding, and relay coil to protect the same from damage.

5. In a generator system, the combination comprising a generator, a field circuit therefor, a regulator connected in said field circuit, a control winding for said regulator connected across the output of said generator, a relay switch to control the connection of said generator to a load line, a relay coil and energizing circuit to actuate said relay switch, an overvoltage coil connected across said generator, a gang relay operably associated therewith, said gang relay including switch members to control the field circuit, regulator circuit, control winding circuit, and circuit of the relay coil, said overvoltage coil effective upon a rise in the voltage drop across the field winding of said generator above a predetermined value to actuate its associated switch members so as to open the circuits associated therewith to disconnect said generator, regulator, control winding, and relay coil to protect the same from damage.

ROBERT LOWELL BROWN.

REFERENCES CITED

The following references are of record in the file of this patent:

UNITED STATES PATENTS

| Number | Name | Date |
|---|---|---|
| 1,238,145 | Honold | Aug. 28, 1917 |
| 1,766,489 | Creveling | June 24, 1930 |
| 2,090,524 | Bany | Aug. 17, 1937 |